Feb. 19, 1924.
J. W. BAILEY
1,484,316
AUTOMOBILE BRAKE
Filed Feb. 14, 1921
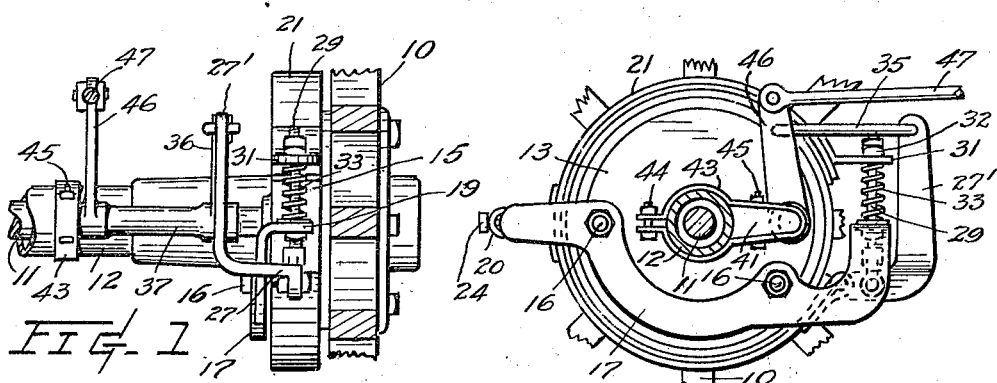
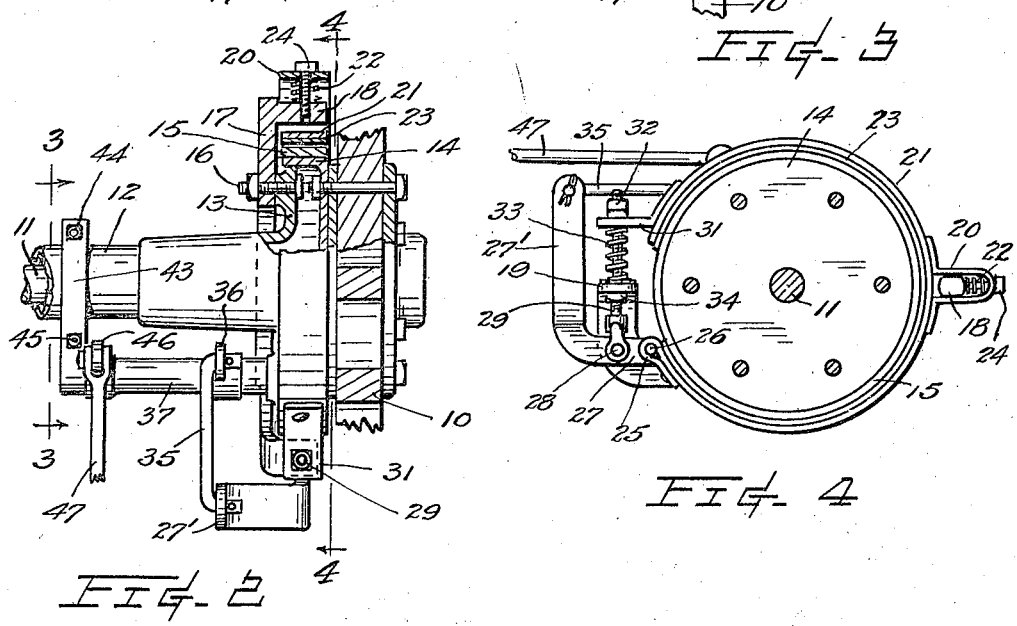
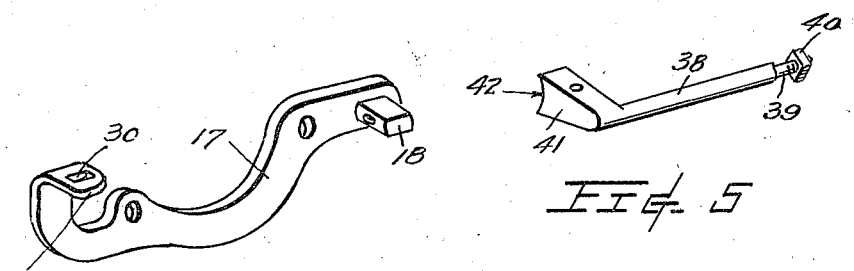
INVENTOR:
John W. Bailey
BY
Pierre Barnes
ATTORNEY Patented Feb. 19, 1924.

1,484,316

UNITED STATES PATENT OFFICE.

JOHN W. BAILEY, OF SEATTLE, WASHINGTON, ASSIGNOR TO BAILEY BRAKE CO., OF SEATTLE, WASHINGTON, A CORPORATION OF WASHINGTON.

AUTOMOBILE BRAKE.

Application filed February 14, 1921. Serial No. 444,661.

*To all whom it may concern:*

Be it known that I, JOHN W. BAILEY, a citizen of the United States, residing at Seattle, in the county of King and State of Washington, have invented certain new and useful Improvements in Automobile Brakes, of which the following is a specification.

This invention relates to wheel-brakes for automobiles.

The object of my invention is the perfecting of devices of this character and, more especially, the braking appliances of the type wherein a circular flange portion of the axle housing extends into a drum rigidly secured to one of the rear wheels to render the same more efficient and convenient to operate.

The invention consists in the novel construction, adaptation and combination of parts hereinafter described and claimed.

In the accompanying drawings, Figure 1 is a fragmentary front elevational view of a portion of an automobile wheel and axle assembly, with an embodiment of my invention applied thereto. Fig. 2 is a plan view of the same, shown partly in horizontal section. Figs. 3 and 4 are sectional views through 3—3 and 4—4 of Fig. 2. Fig. 5 is a perspective view of the pivotal support for the rocker arm member. Fig. 6 is a similar view of the brake-band supporting bar.

In said drawings, the reference numeral 10 represents a portion of an automobile traction wheel having an axle 11 extending through a housing 12. Said housing is provided adjacent to said wheel with a circular flange 13 extending into a drum 14 which is rigidly secured to the wheel. All of the above referred to parts are or may be similar to parts now in use in braking appliances of this general type.

According to the present invention, to the periphery of the drum 14 I preferably secure a ring 15 to afford a relatively large frictional area. Secured, as by bolts 16, to the housing flange 13 is a bracket bar 17 of substantially the form shown in Figs. 3 and 6 and of a length greater than the diameter of the drum ring 15.

Protruding laterally from the respective ends of said bar is a stud 18 and a shelf element 19, the same being located at diametrically opposite sides of the ring 15, or nearly so. The bar stud 18 extends into a loop shaped attachment 20 of a brake-band 21 to support the latter at about its midlength.

22 represents a spring positioned within the attachment 20 and acts against the stud 18 to yieldingly retain the brake-band lining 23 out of contact with the drum element 15 subject to an adjustment screw 24.

One end of the brake-band is formed with a loop 25 to receive a pin 26 for connecting the same to the arm 27 of a bell-crank lever which is connected by a pin 28 (Fig. 4) to the bifurcated lower end of a screw threaded rod 29. The rod 29 extends upwardly through a guide slot 30 (Fig. 6) provided in the shelf element 19 of the bar 17 and also through an apertured lug 31 secured to and constituting an extension for the other end of the brake-band.

A nut, or nuts, 32 engaging the rod 29 above said lug prevents the withdrawal of the rod from the latter. The slotted shelf 19 of the bar 17 not only serves as a guide for the rod 29, but also serves as a support for a helical spring 33 which tends to disengage the brake-band from the brake drum. A nut 34 taking the thread of the rod 29 and engageable against the underside of the shelf 19 is advantageously employed to regulate the positions of the brake-band ends with respect to each other and to the drum. The other arm $27^1$ of said lever is connected by a link 35 with an arm 36 extending upwardly from a sleeve 37 which is mounted for oscillatory movements upon an arbor 38.

One end of the arbor 38 is provided with a screw threaded reduced portion 39 (Fig. 5) extending through an aperture provided in the housing flange 13 to receive a securing nut 40 within the drum. The other end of said arbor is formed integral with a block 41 having a concave seating face 42 which is rigidly held against the housing 12 by means of a metal strap 43 and clamping bolts 44 and 45, as best shown in Fig. 3. Said sleeve is also provided with a second arm 46 which is connected by one or more links, such as 47, leading from suitable operating means (not shown) adapted to be actuated by the driver of the vehicle to which the invention is applied.

The manner of assembling and securing the various above described parts in their respective places will, it is thought, be understood from the drawings and the foregoing description.

The frame work thus produced is of economical construction and is adapted to be readily secured to the structure of an automobile to afford an efficient support for brake devices of greater efficiency than those included in the standard equipment of that type of vehicles. The spring 33 cooperates with spring 22 to normally retain the brake-band in its inoperative relation with respect to the brake-drum. When the operating link is actuated by a pedal or hand lever, the arms 46 and 36 are swung forwardly to transmit power through link 35 and bell-crank lever 27—27¹ to cause the brake-band 21 to embrace the drum in opposition to the spring 33 for the purpose of retarding or interrupting the rotation of the associated vehicle wheel.

What I claim, is,—

1. An apparatus of the character described, the combination with a vehicle wheel, a brake drum rigidly secured thereto, an axle for said wheel, an axle housing provided with a circular flange element, a brake band, a bell crank lever connected to one end of said brake band and a screw threaded rod connecting said bell crank lever to the other end of the brake band, of a bracket bar rigidly secured to the housing flange at substantially diametrically opposed sides of the brake drum, the opposite ends of said bar respectively serving as a support for the brake band and as a guide for said rod, a nut provided on said rod to limit the separation of the brake band ends with respect to each other, a spring interposed between the rod guiding end of said bar and the brake band, an arbor secured to the axle housing, a sleeve mounted upon said arbor and provided with an arm, a link making connection between said arm and the bell crank lever, a second arm mounted on the sleeve and manually operable connections to the second arm to impart rotary motion to said sleeve for actuating the brake band through the medium of said link and the bell crank lever.

2. In a braking device for a vehicle wheel having a housing for the wheel axle, a brake drum secured to the vehicle wheel, a brake band, means secured to said housing for supporting said brake band and a bell crank lever connected to one end of the brake band, an adjustable arm for connecting the other end of the brake band to said bell crank lever, of an arbor secured to the axle housing, a sleeve mounted on said arbor and provided with an arm, a link making connection between said arm and one end of the bell crank lever, and a second arm mounted on the sleeve and manually operable connections to said second arm for imparting a rotary motion to said sleeve for actuating the brake band through the medium of said link and the bell crank lever.

Signed at Seattle, Washington, this 8th day of February, 1921.

JOHN W. BAILEY.

Witnesses:
PIERRE BARNES,
MARGARET G. SUPPLE.